United States Patent [19]

Scheid, Jr.

[11] 4,261,196
[45] Apr. 14, 1981

[54] METHOD AND APPARATUS FOR DETERMINING SOLIDS CONVEYED IN A SLURRY MOVING IN A PIPE

[76] Inventor: Charles H. Scheid, Jr., 3402 Oakenshaw Pl., Baltimore, Md. 21218

[21] Appl. No.: 79,834

[22] Filed: Sep. 28, 1979

[51] Int. Cl.³ .............................................. G01N 9/00
[52] U.S. Cl. ................................. 73/32 R; 73/861.04; 73/861.18
[58] Field of Search .......... 73/32 R, 53, 61 R, 194 M, 73/194 A, 205 D, 205 L, 198, 214, 861.01, 861.02, 861.03, 861.04, 861.69, 195; 406/88, 92

[56] References Cited

U.S. PATENT DOCUMENTS

| | | | |
|---|---|---|---|
| 2,929,248 | 3/1960 | Sprenkle | 73/198 |
| 2,991,650 | 7/1961 | Katzenstein et al. | 73/194 M |
| 3,719,207 | 3/1973 | Takeda | 406/92 X |
| 3,785,204 | 1/1974 | Lisi | 73/861.03 |
| 3,926,050 | 12/1975 | Turner et al. | 73/205 D |
| 4,010,645 | 3/1977 | Herzl | 73/32 R X |
| 4,019,720 | 4/1977 | Levesque et al. | 406/92 X |
| 4,135,387 | 1/1979 | Benedict | 73/53 |

FOREIGN PATENT DOCUMENTS 533871 10/1976 U.S.S.R. ................................ 73/214

*Primary Examiner*—James J. Gill
*Attorney, Agent, or Firm*—Walter G. Finch

[57] ABSTRACT

The invention is an improved method and apparatus for determining the quantity of solids being conveyed in a slurry that is moving in a pipe. The method and apparatus combines a density-sensitive flowmeter (elbow meter) with a density-insensitive flowmeter (ultrasonic doppler flowmeter) to determine the quantity of solids conveyed in a slurry that is moving in a pipe. Velocity is determined by using a sonic flowmeter which is not affected by slurry specific gravity. Specific gravity is determined by dividing the signal from an elbow meter, which is a linear function of specific gravity, by the square of the sonic flowmeter signal. Numerous methods and apparatus are included to improve the accuracy of both the sonic flowmeter and the elbow meter.

12 Claims, 11 Drawing Figures

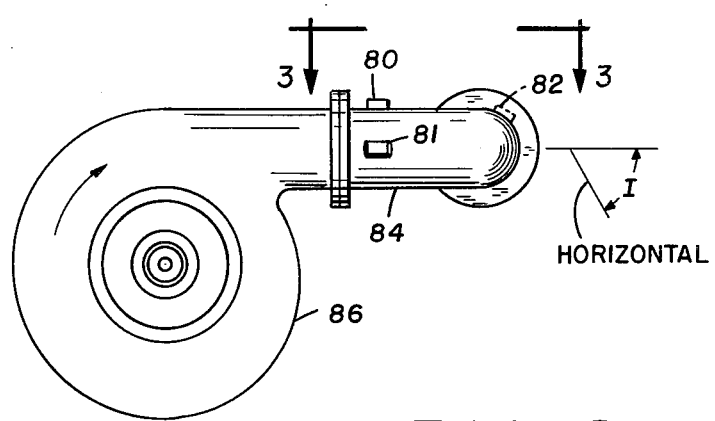
FIG. 2
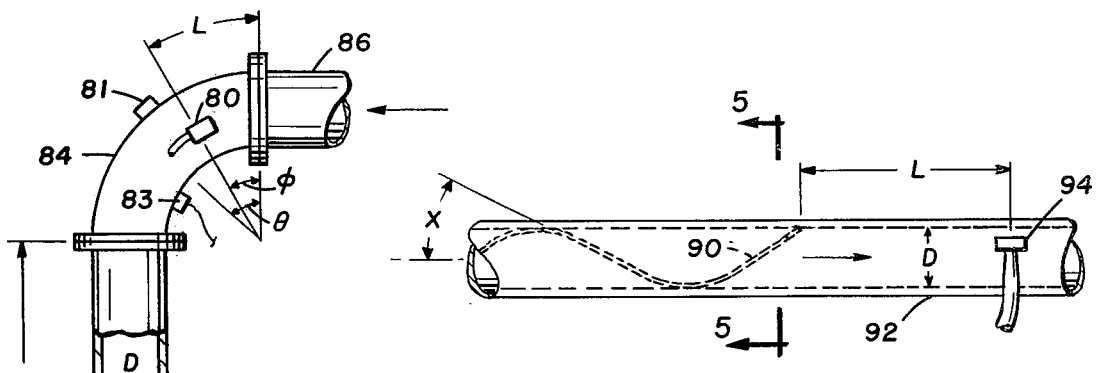
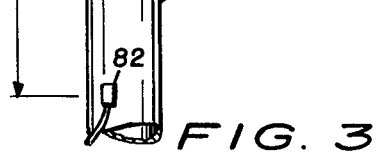
FIG. 3
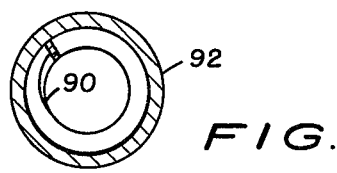
FIG. 5
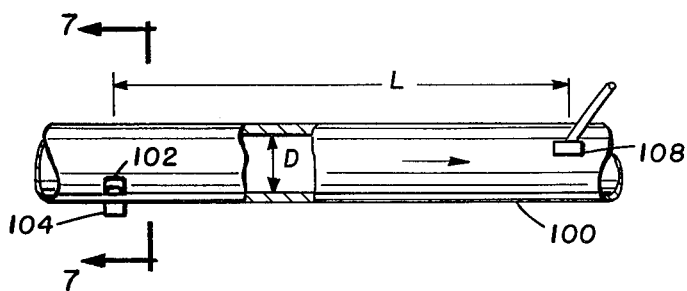
FIG. 6
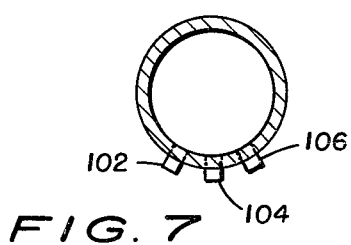
FIG. 7

METHOD AND APPARATUS FOR DETERMINING SOLIDS CONVEYED IN A SLURRY MOVING IN A PIPE

BACKGROUND AND SUMMARY OF THE INVENTION

The invention relates to metering devices, and particularly to metering devices measuring the flow of material in a pipe. Specifically, the invention relates to a method and apparatus for determining and indicating the data that is related to the quantity of solids conveyed in a solid-liquid slurry that is flowing in a pipe.

The invention has application in numerous fields where solids are moved or transported in a slurry in a pipe system, such as, but not limited to, the coal industry, dredging operations, mining and quarrying, and other similar or comparable material handling situations. For illustrative purposes, several comments are directed toward uses in the dredging industry as this is one of the primary fields of application. The illustrations may have similar or comparable application to the other industries.

Present practice for dredge production instrumentation is to use a nuclear density gauge to measure slurry specific gravity and either an elbow meter, or a magnetic flowmeter to measure velocity. U.S. Pat. No. 3,926,050 describes such a method and apparatus.

One major disadvantage of the aforementioned systems has been the license requirement and legal restriction associated with the transportation and use of nuclear equipment and materials. The primary objective of this invention is to provide an alternative system which replaces the nuclear gauge with a combination of two commerically available sensors, a differential pressure transmitter and an ultrasonic doppler flowmeter, hereinafter referred to as a sonic flowmeter.

The invention provides a means for measuring the weight or quantity of particles moving over a period of time. It can also measure the velocity of the slurry as a separate readout.

While the flowmeter described is of the ultrasonic doppler type, favored because of its cost advantage, this is not intended to exclude other types of flowmeters that are not significantly affected by slurry specific gravity, such as the magnetic flowmeter, which is used at present, and other types of sonic flowmeters.

This invention includes the equipment necessary to combine the output signals from the differential pressure transmitter and the sonic flowmeter, perform the mathematical calculations, and display the data related to the quantity of solids conveyed.

Sonic flowmeters particularly, and to a lesser extent the other types of flowmeters not affected by slurry specific gravity, are very sensitive to local variations of velocity within a pipe. For coarse sand and gravel moving at relatively low velocities in a horizontal pipe, the sand and gravel moves slowly along the bottom of the pipe while nearly clear water flows at a higher velocity above the solids. The doppler ultrasonic flowmeter works by bouncing sound waves off of the solid particles and measuring particle velocity. Erratic results are obtained if the sonic flowmeter's sensor is located near the bottom of the pipe due to low velocity of the solids and also due to the high concentration of solids there. When the sensor is located near the top of the pipe, the flowmeter indicates a velocity much higher than the desired average velocity of slurry within the pipe. Thus, under the conditions described, sonic flowmeter indication is unsatisfactory for most applications.

Only at several specific locations or by using several special devices, all of which are included in this invention, does the sonic flowmeter give an accurate indication of average slurry velocity, at least under the conditions described. Results are satisfactory for most solids in a vertical pipe that is well removed from any elbows or fittings, rarely available in dredging systems, or for fine sand at high velocity.

Exceptional accuracy is required of both the density-sensitive flowmeter (elbow meter) and density-insensitive flowmeter (sonic) when the signals are combined to determine the slurry's specific gravity. The reason for this is apparent from a consideration of a slurry having 1.111 specific gravity. Only ten percent of the elbow meter's differential pressure is due to the presence of solids in the slurry. Since, as shown hereinafter, the sonic flowmeter's signal is squared, just a five percent error in this signal could cause an indication of 1.00 specific gravity, indicating falsely that no solids were being pumped or moved in the pipe.

It is, therefore, an object of the invention to provide a method and apparatus for determining solids being conveyed in a slurry that is moving in a pipe.

It is another object of the invention to provide a method and apparatus for determining solids being conveyed in a slurry that is moving in a pipe that does not use nuclear gauging equipment.

It is also an object of the invention to provide a method and apparatus for determining solids being conveyed in a slurry that is moving in a pipe that uses a combination of two commercially available sensors.

It is still another object of the invention to provide a method and apparatus for determining solids being conveyed in a slurry that is moving in a pipe by using a differential pressure transmitter and an ultrasonic doppler flowmeter.

It is yet another object of the invention to provide a method and apparatus for determining solids being conveyed in a slurry that is moving in a pipe by providing the optimum locations and positions for both the elbow meter and the sonic flowmeter sensors, including a special calibration procedure.

It is also another object of the invention to provide a method and apparatus for determining solids being conveyed in a slurry that is moving in a pipe by automatically performing the mathematical calculations and displaying the data.

Further objects and advantages of the invention will become more apparent in the light of the following description of the preferred embodiments.

BRIEF DESCRIPTION OF THE DRAWINGS

FIG. 2 is an alternative location of the sonic flowmeter sensor near a pump;

FIG. 3 is a side view of FIG. 2 on line 3—3;

FIG. 4 illustrates the locations of a sonic flowmeter sensor when used with a helical rib inside of a pipe;

FIG. 5 is a cross sectional view taken on line 5—5 of FIG. 4;

FIG. 6 illustrates the location of a sonic flowmeter sensor when used with an arrangement of water jets;

FIG. 7 is a cross sectional view taken on line 7—7 of FIG. 6;

DESCRIPTION OF THE PREFERRED EMBODIMENTS

Figure 1:
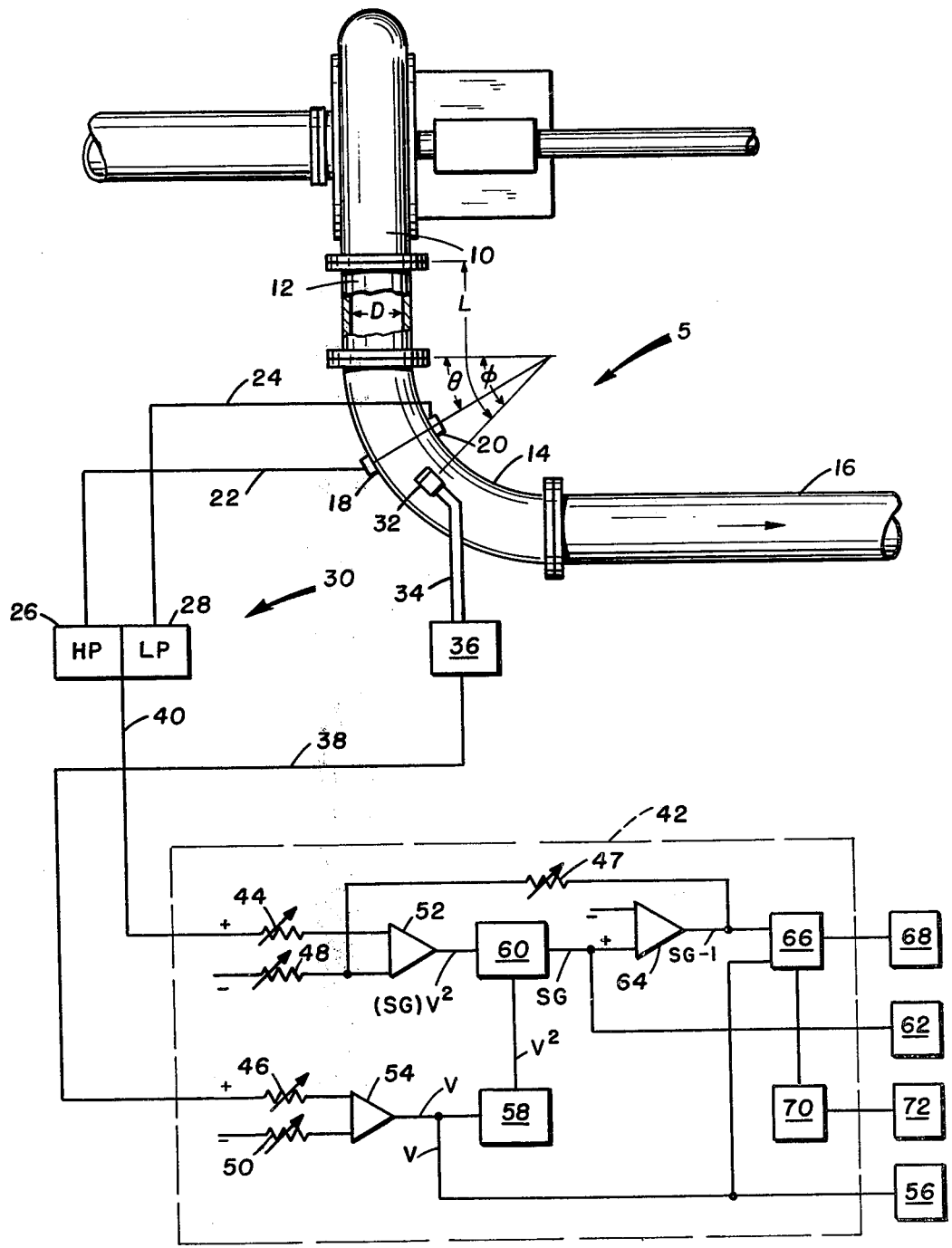
FIG. 1 is a schematic diagram of the computation unit and displays and a schematic illustration of the location of the sensors near a pump discharge for an apparatus to determine solids conveyed in a slurry moving in a pipe.

Referring to the drawings and particularly to FIG. 1, an apparatus arrangement for determining solids being conveyed in a slurry that is moving in a pipe is shown at 5.

A pump 10 pumps slurry and discharges the slurry into a pipe system beginning in a pipe 12 and flowing into an elbow 14 and then into other portions of the pipe system such as pipe 16. Directional arrows indicated the direction of flow in FIG. 1 as well as in other illustrations.

The discharge of the pump 10 as illustrated is at the top and substantially horizontal, from 45 degrees below the horizontal to 45 degrees above the horizontal.

Elbow meter taps 18 and 20 are installed in elbow 14 by welding pipe couplings, or similar piping hardware, on to the exterior of the elbow 14 and then cutting or drilling holes through the elbow 14 inside the coupling. When in use these elbow meter taps 18 and 20, and the tubing hereinafter described, may be either purged with a continuous supply of clear water or may contain a porous device, neither of which is shown, to prevent sand from reaching and plugging up the tubing hereinafter described. Tubing 22 connected elbow meter tap 18 with the high pressure side 26 of the differential pressure transmitter 30, and tubing 24 connects elbow meter tap 20 with the low pressure side 28 of the differential pressure transmitter 30.

The sensor 32 of the sonic flowmeter is clamped or glued or otherwise affixed to the exterior of the slurry conduit, in this case the elbow 14. It is to be understood that in other arrangements of the invention as hereinafter described this may be on a pipe or other element of the conduit means.

A cable 34 connects the sensor 32 to its amplifier unit 36. The electrical output signal from the amplifier unit 36, which is a linear function of slurry velocity, is transmitted by electrical cable 38 to the computation unit 42.

The electrical output signal from the differential pressure transmitter 30, a linear function of elbow meter differential pressure which is a square function of a slurry velocity, is transmitted by electrical cable 40 to the computation unit 42.

In the computation unit 42, the signals from the differential pressure transmitter 30 and from the amplifier unit 36 first go through the variable resistors 44 and 46 which allow the effective span of each transmitter to be adjusted. Commerically available transmitters of both types usually have integral span adjustments, but they are not as convenient to use. Zero adjustments are provided for each signal by variable resistors 48 and 50. The adjusted signals are then processed through amplifiers 52 and 54.

The signal originating from the sonic flowmeter amplifier unit 36, after amplifier 54, is the velocity indication and is transmitted to the velocity display 56. The velocity indication is also processed in the squaring unit 58 to produce the signal "velocity squared" ($V^2$).

The signal originating from the differential pressure transmitter 30, after amplifier 52, represents specific gravity times velocity squared. This indication [$(SG)V^2$] enters the dividing unit 60 as the dividend which is divided by velocity squared ($V^2$), the output from the squaring unit 58. The resulting quotient is the specific gravity (SG) which is transmitted to the specific gravity display 62.

The specific gravity indication is also transmitted to the amplifier 64 which subtracts the value of one from the specific gravity and the remainder (SG−1) enters the multiplier unit 66, along with the velocity (V) from the amplifier 54. The resultant product is, after incorporating a suitable constant that depends upon pipe size and other factors, the tons of solids per hour moving in the pipe system. This rate of tons per hour is transmitted to the rate display or tons per hour display 68.

These displays (56, 62, and 68) may be of several different types that are readily available, such as analog, digital, and other types.

The output from the multiplier unit 66 is also transmitted to the voltage to frequency converter 70 and then to electromechanical counter 72 or similar device to record the total quantity of solids conveyed.

Although not shown, computation unit 42 will normally include provisions for internal calibrations, test circuits, strip chart recorder output, and similar facilities, which is standard practice for production instrumentation.

It is to be understood that while the aforegoing description of the computation unit 42 is based on an electronic system, the use of fluidics or other means to perform the operations is within the scope and intent of this invention.

As mentioned hereinbefore, the location of the sonic flowmeter's sensing unit 32 is critical when used in the combined elbow meter-sonic flowmeter arrangement. It is also important for satisfactory accuracy when the sonic flowmeter is used alone. A further discussion follows.

For the top horizontal pump discharge shown in FIG. 1, the sensor 32 is located a total distance "L" from the pump 10, measured along the centerline of pipe 12 and elbow 14.

Tests indicate that accuracy is best when the distance "L" is approximately four times the inside diameter "D" of the slurry conduit. Accuracy is generally satisfactory when "L" is anywhere between two times "D" and six times "D", except that the angle $\phi$ shown in FIG. 1 must not exceed 60 degrees. Range of two to six times "D" is irrespective of whether sensor 32 is located on sides of elbow 14 as shown in FIG. 1 or is located on pipe 12 ahead of elbow.

Sand and gravel particles are centrifuged to the outside of the pump case, but at the pump discharge begin to settle downward in the slurry. This cascading clump of slow-moving particles is broken up and accelerated by the high velocity water beneath it. The slurry is well-mixed and velocity is nearly uniform at a distance "L" equal to four times "D". By the time large particles reach a distance of six times "D" from the pump discharge, they have settled to the bottom and slowed down considerably. Thus, in the latter situation, the sonic flowmeter indicates too high a velocity.

Angle $\phi$ must not exceed 60 degrees as particles are centrifuged to the outside of an elbow, beginning to move again as a slow-moving clump at approximately this point.

When distance "L" is less than two times "D", the pump turbulence is excessive, this results in unacceptable nonlinearity in the sonic flowmeter signal.

Referring now to FIG. 2, the representation is similar to that shown in FIG. 1, except that the pump discharge is substantially vertical, instead of substantially horizontal. FIG. 3 is a side view of FIG. 2. In FIG. 2 the angle I, measured from the horizontal, is between 45 degrees and 90 degrees.

Illustrated in FIGS. 2 and 3 is also a condition where there is no straight section of pipe between pump discharge and the elbow, such as the pipe 12 in FIG. 1. In FIGS. 2 and 3 the desired distance "L" to the sonic flowmeter sensor 80 is not affected by the fact that there is no straight pipe section in the system. Also if there was such a straight section, desired distance "L" would not be affected by whether sensor 80 is located on straight pipe or on sides of elbow. The minimum acceptable distance "L" is still two times "D"; it is measured along the straight pipe, if present, plus along the centerline of the elbow. In a case such as this, where the discharge from the pump is vertical, there is no maximum acceptable distance from the pump, in fact, the further from the pump the better it is, except that the angle $\phi$ still must not exceed 60 degrees.

In the case as illustrated in FIGS. 2 and 3, note that the sonic flowmeter sensor 80 is located on the side of the elbow, as is the sensor 32 in FIG. 1. Tests have shown that the error that might occur is acceptable at this location, regardless of the complex flow patterns within an elbow, but the error that occurs when the sensor is on the inside or outside of the bend of the elbow is not acceptable.

Also shown in FIGS. 2 and 3 is a sensor 82 located near the top of a substantially horizontal pipe 88. This is an illustration of a sensor installation that might be made in a series of instrumentation placements or a placement for a special purpose. The sensor 82 is located at a distance "L" from an elbow which has its inlet leg substantially vertically upwardly (it may be inclined as much as 45 degrees from the vertical). Sand and gravel particles from the pump 86 are centrifuged to the outside of the elbow 84 and hence are at the top near the end of the elbow 84 and the beginning of the straight pipe 88. The situation is similar to that occurring after the pump 10 in FIG. 1 with a top horizontal discharge, except that the particles are moving at an even slower velocity in this case. As more time is required to break up and accelerate the slower moving clump, the best accuracy occurs when the distance "L" is approximately six times "D" compared to the previously stated four times "D". Accuracy is acceptable when the distance "L" is anywhere between three times "D" and nine times "D". Tests have indicated that the effect of turbulence in this area is acceptable even though a major supplier of sonic flowmeters recommends a minimum distance "L" of 15 to 20 times "D" after an elbow.

Referring now to FIGS. 4 and 5, a helical rib 90 is installed in a straight horizontal section of pipe 92 and having a sensor 94 near the top of the pipe at a distance "L" from the helical rib 90. The helical rib 90 forces the slow moving bed of sand and gravel on the bottom of the pipe 92 to be rotated to the top of the pipe 92. Thereafter, the clump is broken up and accelerated in the same manner as for the vertical elbow 84 discussed hereinbefore.

As in the case mentioned hereinbefore, the best accuracy occurs when the distance "L" after the end of the helical rib 90 is six times "D". The accuracy is acceptable when the distance "L" is anywhere between three times "D" and nine times "D".

A typical configuration for a single helical rib 90 is a rectangular bar of width D/4 bent in a helical curve, the helix angle X being 15 degrees and the helical rib 90 ending at 45° before the top of the pipe 92 at each end of the helical rib 90. It is to be noted that exact configuration of the helical rib 90 is not essential and multiple ribs or different helix angles would be satisfactory and is within the scope and intent of this invention.

Referring now to FIGS. 6 and 7, show another way to elevate the clump of solids moving slowly along the bottom of the pipe 100, to the top of the pipe 100. In this case water taps 102, 104, and 106 are attached to the bottom area of the pipe 100 so that jets of high pressured water can be injected through them. The high pressure jets of water lift up the clump of solids at the bottom of the pipe 100. The clump of solids is then broken up and accelerated in a similar manner as for the vertical elbow 84 and the helical rib 90 hereinbefore described.

As in the previous cases, the best accuracy occurs when the distance $\mp L$ after the water jets from the water taps 102, 104, and 108 is six times "D". The accuracy is acceptable anywhere between three times "D" and nine times "D".

A typical configuration would have three water jets, such as 102, 104, and 106, $1\frac{1}{2}$ inches in diameter and spaced 30 degrees apart.

It is to be noted that a variation in the number of water jets, the size of the water jets, and the spacing of the water jets is within the scope and intent of this invention. The exact configuration of the water jets is not essential and the number and size will vary, particularly with the variations of the inside diameter "D" of pipe 100.

As accuracy of the elbow meter is critical when used in the combined elbow meter-sonic flowmeter system, special consideration must be given to elbow meter tap location and arrangement. Tests indicate that accuracy is best when radial taps are used with both taps lying in a plane which passes radially through the center of the bend.

Figure 8:
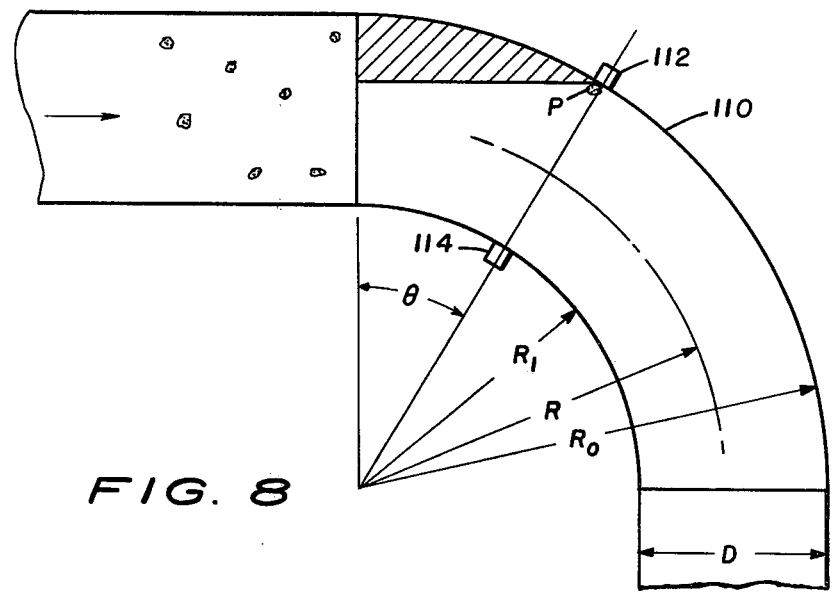
FIG. 8 is a longitudinal section through an elbow which is used to derive a formula.

Referring now to FIG. 8, assume that solid particles are large and that their trajectory before impacting the outer wall of an elbow 110 approximates a straight line. Also assume a two dimensional elbow. Assume some angle from the beginning of the elbow for the installation of the elbow meter taps 112 and 114. A particle P is shown that just impacts the outer wall of the elbow 110 art an angle $\theta$. All particles above P will impact the outside wall before reaching angle $\theta$. Hence, their weight will not be reflected in the pressure difference between the two taps 112 and 114. The fraction of particles that do affect tap pressures is the total number of particles minus those above particles P (in crosshatched area) divided by total number of particles or $$\frac{(R_0 - R_1) - R_0(1 - \cos \theta)}{R_0 - R_1} = \frac{R_0 \cos \theta - R_1}{R_0 - R_1}$$

The pressure effect of each particle that does reach angle $\theta$ without contacting the outer wall is a function of the radial component of its velocity squared or $(V \times \sin \theta)^2$. The total effect at the taps is a function of the fraction of particles times each particles effect. Thus, tap ΔP varies as $$\frac{R_0 \cos \theta - R_1}{R_0 - R_1} \times (V \times \sin \theta)^2$$

Optimum tap location is the angle where this ΔP is maximum. This may be found by taking the first derivitive of the above expression with respect to the angle θ and setting it equal to zero. After simplifying the equation, the result is the optimum angle θ as a function of $R_1$ and $R_2$ so that $$\cos \theta - \frac{(\sin \theta)^3}{\sin 2\theta} = \frac{R_1}{R_0}$$

The extremes of the ratio $R_1/R_0$ for elbows normally used in the dredging industry, as an example, is 3/5 and 5/7 (R/D=2.0 and 3.0) and the corresponding optimum angles θ from the above formula are 35.8 degrees and 30.4 degrees respectively. The two angles being used at present for elbow meters are 22.5 and 45 degrees which differ considerably from what the above formula indicates is optimum. The tolerance of locating the angle θ may be plus or minus 10 degrees.

A significant difficulty occurs when using radial taps if the elbow is not horizontal. The two elbow meter taps will be at different elevations, and consequently an undesirable pressure difference will be observed that is equal to specific gravity of slurry being pumped minus one, times the difference in elevation between the taps. For elbows only slightly inclined from the horizontal, this undesirable effect may be ignored. For nearly vertical elbows, this effect may be eliminated either electronically or by a special tap location. It is to be noted that present practice avoids this problem of an elevation difference by not using radial taps. Instead, both taps are located in the same horizontal plane while also being in a plane passing through the centerline of the elbow (See elbow meter taps 81 and 83 in FIGS. 2 and 3).

The electronic method is illustrated in FIG. 1. A variable resistor 47 is set to allow a predetermined portion, depending on the difference in elevation between the two taps, of the specific gravity minus one signal from amplifier 64 to feed back to the zero adjustment input of resistor 48 processed through amplifier 52. This eliminates the elevation effect from the elbow meter signal.

Figure 9:
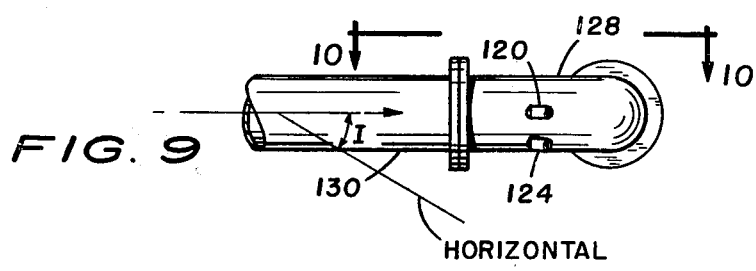
FIG. 9 illustrates an elbow meter tap location on an inclined elbow.
Figure 10:
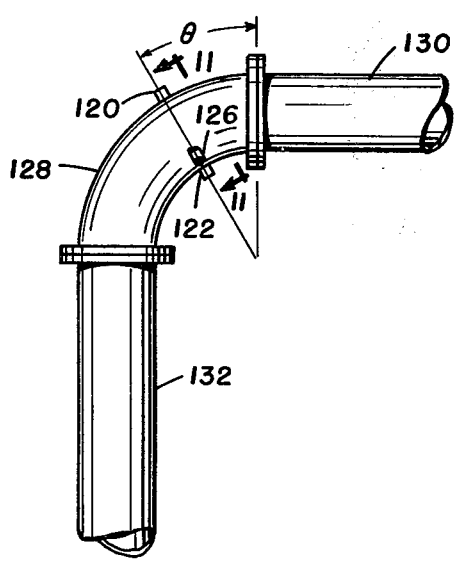
FIG. 10 is a side view of FIG. 9 on line 10—10.
Figure 11:
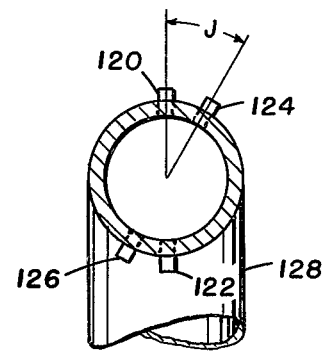
FIG. 11 is a cross sectional view taken on line 11—11 of FIG. 10.

Referring to FIGS. 9, 10, and 11, these show the special tap location method for solving the elevation problem. Elbow meter taps 120 and 122 are the conventional radial taps which lie in a plane passing through the center-line of the elbow 128. Elbow meter taps 124 and 126 are the special taps located in another radial plane, but on a line rotated an angle J (in FIG. 11) from the plane passing through the centerline of the elbow 128. Angle I (in FIG. 9) is the inclination of the elbow 128. The angle θ gives the location of the radial plane of the taps (120, 122, 124, and 126) determined from the equation for optimum tap location presented hereinbefore. The discharge from the pump flows through elbow 128 and then into the straight pipe 132.

Analysis indicates that the desired angle J that results in the same elevation for both taps 124 and 126 may be determined from the equation: Sin J=Sin θ×Sin I. Location of the elbow meter taps 124 and 126 according to this equation eliminates the elevation problem, but does slightly reduce the pressure difference between the taps. It is only necessary to reduce the span setting of the differential pressure transmitter by the factor cos J to obtain correct results.

Regarding the calibration procedure, the following discussion will clarify the matter. Usually, when the sensor of the sonic flowmeter is located at the optimum location after the pump, and sometimes at the other locations as well, its velocity indication still will not be accurate enough to be used in the combined elbow meter-sonic flowmeter system without correcting the error with a special calibration procedure.

The special calibration procedure, which is outlined hereinafter, compensates for turbulence induced by the pump and other factors, which is not a linear function of velocity. This calibration procedure also has the advantage that it automatically determines the proper span setting (without regard to actual differential pressure developed by elbow meter, and other factors) for measuring slurry specific gravity by using the readily available known reference, clear water. The calibration procedure is:

1. Preset the factory-determined settings on transmitters 30 and 36.

2. Set zero of elbow meter differential pressure transmitter (usually transmitter drained) either at the transmitter 30 or at variable resistor 48.

3. Pumping clear water at the lowest normal operating velocity, adjust zero adjustment of sonic flowmeter (either on readout 62, adjustment 50, on sonic flowmeter 36, or on a combination thereof) until specific gravity reads 1.00.

4. Pumping clear water at highest normal operating velocity, adjust span adjustment (either on readout or on transmitter or both) of either sonic transmitter 36 and span adjustment 46 or Elbow Meter transmitter 30 and span adjustment 44 until specific gravity reads 1.00. Either way will yield correct specific gravity response, but adjustment of elbow meter span is preferred as it does not have an undesirable effect on velocity.

5. Repeat steps 3 and 4 until each adjustement has a negligible effect on each other.

In reference to the means of lifting or elevating the solids from the bottom areas of the pipe, such an elbow 84 with its inlet leg substantially vertically upward, the helical rib 90, and the water jets 102, 104, and 106, it is to be understood that any means of causing this lift or elevation of the solids is within the scope and intent of this invention. Further, it is to be understood that placing the sonic flowmeter downstream after any such lifting or elevation device between three and nine times the inside diameter of the pipe is also within the scope and intent of this invention.

As can be readily understood from the foregoing description of the invention, the present structure can be configured in different modes to provide the ability to determine the solids conveyed in a slurry moving in a pipe.

Accordingly, modifications and variations to which the invention is susceptible may be practiced without departing from the scope and intent of the appended claims.

What is claimed is:

1. An apparatus for determining the quantity of solids conveyed in a slurry when moving in a piping system, comprising:

a piping system having at least one elbow with a flange and a straight pipe;

a density-sensitive flowmeter, said density-sensitive flowmeter being an elbow meter, said elbow meter being installed in an elbow of said piping system, an elbow tap means, said elbow meter being connected to said elbow by said elbow tap means, said taps for connecting said elbow meter into said elbow being located in said elbow at an angle $\theta$ from the face of said elbow flange at which said slurry enters said elbow, said angle $\theta$ being determined from formula $$\cos\theta - \frac{(\sin\theta)^3}{\sin 2\theta} = \frac{R_1}{R_o},$$

where $R_1$ is the inside radius of the interior surface of said elbow and $R_o$ is the outside radius of the interior surface of said elbow;

a density-insensitive flowmeter, said density-insensitive flowmeter being an ultrasonic doppler flowmeter, said ultrasonic doppler flowmeter being installed on said elbow and/or on said straight pipe of said piping system;

a computation unit;

a readout display means, said readout display means being connected to said computation unit to display calculations produced by said computation unit; and a transmitting means, said transmitting means being an electrical wiring system, said transmitting means connecting said density-sensitive flowmeter and said density-insensitive flowmeter to said computation unit to transmit indications of said density-sensitive flowmeter and density-insensitive flowmeter to said computation unit to calculate the quantity of solids conveyed in said piping system.

2. The apparatus as recited in claim 1, wherein the angle $\theta$ has a tolerance of plus or minus 10 degrees.

3. The apparatus as recited in claim 1, wherein said computation unit consists of:

a first span adjustment variable resistor, said first span adjustment variable resistor receiving a signal from said density-sensitive flowmeter through said transmitting means;

a second span adjustment variable resistor, said second span adjustment variable resistor receiving a signal from said density-insensitive flowmeter through said transmitting means;

a first zero adjustment variable resistor;

a second zero adjustment variable resistor;

a first processing amplifier, said first processing amplifier receiving input from said first span adjustment variable resistor and said first zero adjustment variable resistor;

a second processing amplifier, said second processing amplifier receiving input from said second span adjustment variable resistor and said second zero adjustment variable resistor;

an electronic squaring unit, said squaring unit receiving input from said second processing amplifier and squaring the input;

an electronic dividing unit, said dividing unit receiving input from said first processing amplifier and from said squaring unit, said dividing unit dividing said input from first processing amplifier by said input from said squaring unit;

a third processing amplifier, said third amplifier receiving input from said dividing unit and subtracting the value of one;

an electronic multiplier unit, said multiplier unit receiving input from said third processing amplifier, from said second processing amplifier, and from an incorporated constant, said multiplier unit producing a product of said inputs;

an electronic converter unit, said electronic converter unit receiving input from said multiplier unit and converting said input to a total sum; and a transmitting variable resistor, said transmitting variable resistor receiving input from said third processing amplifier and transmitting said input to said first processing amplifier for combining said input with said input from said first zero adjustment variable resistor.

4. The apparatus as recited in claim 3, wherein said readout display means consists of:

a rate display unit, said rate display unit receiving input from said multiplier unit;

a specific gravity display unit, said specific gravity display unit receiving input from said divider unit;

a counter display unit, said counter display unit receiving input from said converter unit; and a velocity display unit, said velocity display unit receiving input from said second processing amplifier.

5. The apparatus as recited in claim 3, wherein said transmitting variable resistor allows a predetermined portion of the input from said third processing amplifier to feedback to said first processing amplifier to eliminate the elevation effect when said elbow meter taps into said piping system are in a radial plane in an inclined elbow.

6. The apparatus as recited in claim 1, wherein said elbow meter tap means are in an inclined elbow and in a radial plane, said elbow meter taps means being rotated at an angle J determined by the formula $\sin J = \sin\theta \times \sin I$ where the angle $\theta$ is determined from the formula $$\cos\theta - \frac{(\sin\theta)^3}{\sin 2\theta} = \frac{R_1}{R_O}$$

where $R_1$ is the inside radius of the interior surface of said elbow and $R_0$ is the outside radius of the interior surface of said elbow and the angle I is the inclination of said elbow from the horizontal, said rotation of said elbow meter taps means being made to eliminate elevation error of said elbow meter taps.

7. The apparatus as recited in claim 3, and additionally, a method for calibrating said apparatus for determining the quantity of solids conveyed in a slurry when moving in said piping system consisting of:

pumping clear water through said piping system at the lowest normal operating velocity, and then adjusting said second zero adjustment variable resistor until the specific gravity reads 1.00;

pumping clear water through said piping system at highest normal operating velocity, adjust said first and second span adjustment variable resistor until specific gravity reads 1:00; and repeating the aforementioned adjustments of said second zero adjustment variable resistor and the said first or second span adjustment variable resistors until each adjustment has a negligible effect on the other.

8. An apparatus for accelerating solids conveyed in a slurry when moving in a piping system and for the measurement of velocity of said slurry after acceleration thereof when moving in said piping system, comprising:
   a piping system having a substantially horizontally arranged pipe;
   a helical rib, said helical rib being affixed to the inside surface of said substantially horizontally arranged pipe of said piping system, said helical rib ending at 45° before the top of said horizontal pipe; and
   a sonic flowmeter sensor, said sonic flowmeter sensor being located on the exterior of said pipe, said sonic flowmeter sensor being located at a point within a range of three times the inside diameter of said pipe and nine times the inside diameter of said pipe following said helical rib, said sensor conveying signals for the measurement of velocity of a slurry.

9. An apparatus for accelerating solids conveyed in a slurry when moving in a piping system and for the measurement of the velocity of said slurry after acceleration thereof when moving in said piping system, comprising:
   a piping system having a substantially horizontally arranged pipe;
   a plurality of water jets, the inlets for said plurality of water jets being installed only in the lower portion of said substantially horizontal pipe of said piping system; and
   a sonic flowmeter sensor, said sonic flowmeter sensor being located on the exterior of said pipe, said sonic flowmeter sensor being located at a point within a range of three times the inside diameter of said pipe and nine times the inside diameter of said pipe following said plurality of water jets, said sensor conveying signals for the measurement of velocity in a slurry.

10. A piping system for conveying solids in a slurry within pipe of said piping system, said piping system having at some point a substantially horizontal pipe following a substantially vertical elbow, and additionally a sonic flowmeter sensor, said sonic flowmeter sensor located on the exterior of said pipe, said sonic flowmeter sensor being located at a point within a range of three times the inside diameter of said pipe and nine times the inside diameter of said pipe following said substantially vertical elbow, said sensor conveying signals for the measurement of velocity.

11. An apparatus for determining the quanity of solids conveyed in a slurry when moving in a piping system, wherein a density-insensitive flowmeter of said apparatus is located at a distance of between three and nine times the inside diameter of the pipe in said piping system downstream from a means for elevating said solids in said slurry.

12. A piping system for conveying solids in a slurry, comprising:
   a piping system having a pipe positioned in the piping system;
   a pumping means discharging either at top substantially horizontal or said pumping means discharging substantially vertically upward directly into an elbow, or into a pipe followed by said elbow; and
   a sonic flowmeter sensor, said sensor being located at a point within a range of two times and six times the inside diameter of said piping system after and from discharge of said pumping means, with the range of said distance being irrespective of said pumping means discharging directly into said elbow or into said pipe followed by said elbow, or said sensor being located on straight pipe or on sides of said elbow, said sensor conveying signals for the measurement of velocity.

* * * * *